F. P. DIMPFEL.
Hot-Blast Oven.
No. 120. Reissued July 11, 1848.
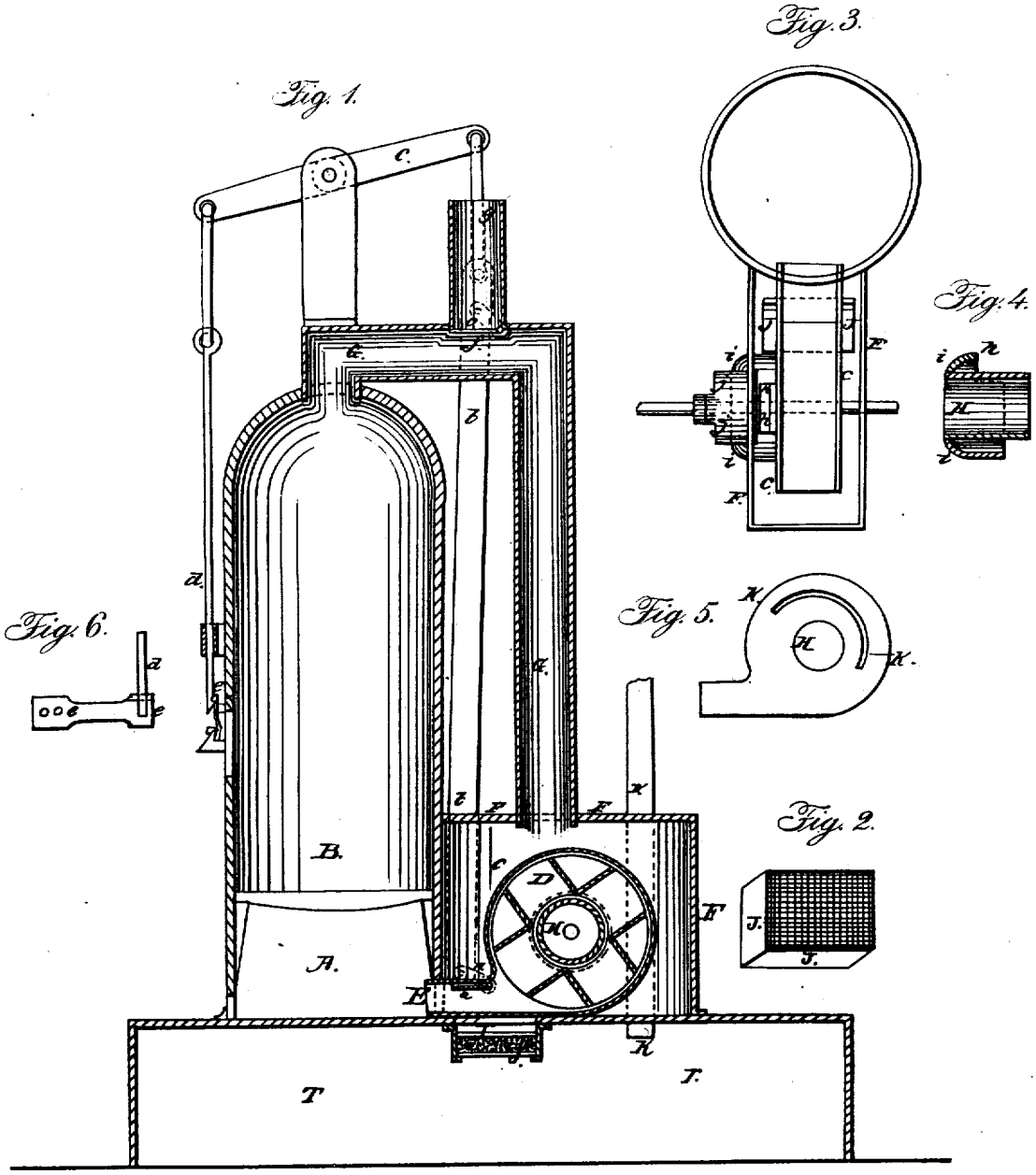
AM. PHOTO-LITHO. CO. N.Y. (OSBORNE'S PROCESS.)

UNITED STATES PATENT OFFICE.

F. P. DIMPFEL, OF PHILADELPHIA, PENNSYLVANIA.

IMPROVEMENT IN FURNACES FOR ECONOMIZING FUEL AND CONSUMING SMOKE.

Specification forming part of Letters Patent No. 1,148, dated May 9, 1839; Reissue No. 120, dated July 11, 1848.

*To all whom it may concern:*

Be it known that I, FREDERICK P. DIMPFEL, of the city and county of Philadelphia, and State of Pennsylvania, have invented new and useful Improvements in Furnaces; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 represents a vertical section of a furnace and blowing apparatus, the respective parts of which are so arranged as to exhibit the manner in which my improvements may be carried into effect. The other figures will be referred to in the description.

The first part of my invention consists in causing the products of combustion to escape from the furnace through a bed or mass of gravel, or other equivalent means of impeding the passage of the products of combustion and subdividing the passage thereof, when this is combined with a fan-blower connected with a closed ash-pit, that the products of combustion, instead of escaping from the furnace by exhaustion into a chimney, shall be forced out through the interstices of the bed by reason of the blast in the ash-pit, whereby the flame, instead of being carried in the direction of the chimney by reason of the exhaustion, shall be longer retained within the furnace or flues and be rendered more effective therein.

The second part of my invention consists in returning to and forcing through the fire a portion of the products of combustion with atmospheric air to effect a more perfect combustion.

The third part of my invention consists in combining with the supplying a blast of mixed atmospheric air and a portion of the products of combustion the method above pointed out of impeding the escape of the products of combustion, or any equivalent or partial equivalent therefor, whereby the pressure in the furnace will cause the more pure gaseous products of combustion to pass out through the interstices, meshes, or apertures of such impeding medium, while all impurities and combustible matter are forced by the pressure and blast to return, together with atmospheric air, (the supporter of combustion,) to the fire, whereby not only is economy of fuel attained, but the escape of smoke and sparks is in a great measure prevented.

The fourth part of my invention consists in placing the fan-blower within an enlargement of the furnace, chimney, or flue, or in any part between the furnace and escape-pipe that it may be surrounded by the heated products of combustion, that the atmospheric air in passing through the fan-blower may be thereby heated. And the fifth and last part of my invention consists in connecting and combining the damper which governs the pipe through which the blast passes from the fan-blower to the furnace with the furnace-door in such manner that when the furnace-door is opened for any purpose the damper in the blast-pipe shall be closed, and vice versa, that the blast may be cut off from the furnace whenever the furnace-door is opened for any purpose.

In the accompanying drawings, Fig. 1 represents the vertical section of a furnace and blowing apparatus, the respective parts of which are so arranged as to exhibit the manner in which my improvement may be carried into effect. A is the inclosed ash-pit of the furnace, of which B is the fire-chamber. D is a fan-wheel which is to revolve within its case C C, the wind from which passes into the inclosed ash-pit at E. The fan-wheel, with its case, is represented as inclosed within a box or enlargement of the flue leading from the furnace, (marked F F,) and through which the gaseous products of combustion escaping from the fire are to pass. G G is a pipe or flue leading from the furnace into the box F F, where a considerable portion of its heat will necessarily be transmitted through the case C C of the fan-wheel to the fresh atmospheric air passing through it. The center tube or opening, H, into the fan-wheel coincides with an opening through one side of the box F for the admission of air to the vane in the ordinary way.

The furnace and blowing apparatus are represented as standing on the top of a hollow chamber, I I, there being an opening between the box or enlargement F and the chamber I I, in which is placed the box J J, which contains the pebbles, stones, or other substances intended to obstruct the draft. At Fig. 2 this box is shown separately in perspective. K K is a pipe or flue leading from the chamber I I and carrying off the gases which have passed through it.

Instead of the chamber I I and its appendages, there may be a flue or chimney leading from the opening in which the box J J is represented as placed, and said box may be situated at the top or in any part of said chimney, and still answer the purpose of keeping up the pressure in the furnace, by the aid of which time is allowed for a more perfect combustion of the smoke and inflammable gases than would otherwise take place, and also for the communication of the heat which is generated to a boiler or to whatever else it is intended to heat. Where wood or other fuel emitting sparks is burned, the application of the box J J will effectually arrest or extinguish them. Such a box adapted to the chimney of a locomotive steam-engine would, it is confidently believed, be perfectly effective in this respect, and the resistance which it would offer to the draft would be counteracted by the use of a fan-wheel, requiring but little power to drive it. The pressure may be preserved in the furnace during the period of supplying it with fuel by the addition thereto of either of the well-known kinds of feeding apparatus which have been used in other furnaces with a similar intention. I, however, have invented a new device for the purpose of arresting the entrance of wind into the ash-pit when the furnace-door is opened to supply fuel, which is as follows:

In the passage leading from the fan-wheel to the ash-pit there is a valve, *a*, Fig. 1, represented as open. *b b* is a rod or shaft, the descent of which closes the valve *a* by depressing the joint-piece *n*, (shown in dotted lines,) which is attached to the shaft of the valve *a*. At its upper end the shaft *b* is attached to the vibrating lever *c*, which also has attached to it the rod *d*, the lower end of which is so formed as to be latched by the spring-catch *e*. (Shown separately in Fig. 6.) When the latch of the door is raised, it strikes the piece *e*, disengages it from the rod *d*, and leaves the rod *b* to descend, which it does by its own gravity, and thus closes the valve *a*. By the same action a valve at *f* may be opened, so as to give an escape to the draft through the pipe *g*, the rod *b* being connected by a joint-pin with the piece *o*, attached to the shaft of the valve. I have, however, found the valve *a* sufficient for my purpose without the addition of that at *g*.

When I wish to pass a portion of the gaseous products of combustion a second time through the fire along with the atmospheric air supplied by the fan-wheel, I make an aperture through the case C C of the fan-wheel within the box F F. This opening I locate so that the pressure of the air within the fan-wheel at the place where it is formed shall be nearly the same with that of the condensed air contained within the furnace or within the box F F, as this air is not to enter in consequence of anything like exhaustion being produced in the furnace, as instead of this a constant pressure is to be maintained there so long as the fan-wheel is in action, as upon this, mainly, I am dependent for the advantages proposed to be attained by me.

Fig. 3 is a top view of the box F F, the cover of which is removed to show the casing of the fan-wheel within it, which is supposed to be my improved wheel above referred to. C C is the casing of this wheel, and *h h* is the opening for the admission of the heated air into the body of the wheel through the chamber formed by the neck *i i*, which portion of the apparatus is shown separately at Fig. 4, which is a section of it.

I regulate the size of the opening *h h* by means of a sliding shutter, which may serve to close it entirely, if desired. This shutter is marked *j j* in the drawings. It is curved so as to adapt it to the cylindrical portion of the casing, and slides in and out through an aperture made to receive it.

When the common fan-wheel is employed, I make an opening through one end of the casing which contains it, as shown at *k k*, Fig. 5, such opening being made at a point where it is judged or experiment may show that the pressure of the air in the box F F will cause it to enter in proper quantity, or, rather, with the proper pressure, as its quantity may be regulated by a sliding shutter or valve.

It will be obvious from the foregoing that various modifications may be made in the mode of applying my invention without changing the essential principle thereof, the leading object of the first part of my invention being, as stated above, to retain the gaseous products of combustion within the furnace under pressure, not only to insure as near as practicable the combustion of all the combustible matter, and to prevent the flame from passing out too rapidly toward the chimney. Instead of the bed of pebbles or earthy matter, any other refractory matter in lumps or balls may be substituted, or simple wire-gauze or perforated metal may be substituted, and produce to a certain extent the intended result, although the bed of gravel or balls of fire-clay will be found the most effective. So of the second part of my invention, the object of which is to return to the fire a portion of the products of the combustion together with a blast of atmospheric air. Instead of causing these to mingle together in the one fan-blower, the same end, varying only in degree, may be attained by using two fan-blowers—one for the blast of atmospheric air, and the other for the return of a portion of the products of the combustion—the two currents either uniting in a blast-pipe leading to the ash-pit or passing through separate pipes and mingling in the ash-pit; or, when a single blower is used, instead of carrying the products of combustion through the fan, they may be made to mingle with the atmospheric air by a pipe leading from the furnace into the blast-pipe and in the direction of the blast of air, that the pressure within the furnace, together with the influence of the direction of the blast of air, may give the required supply to the products of combustion. In short, any desired plan may be adopted by which a portion of the products of combustion may be carried back to the fire, together with a blast of atmospheric air, although it will be found preferable to cause the atmospheric air and the products of combustion to be mingled together in the fan-blower.

As to the insertion of the fan-blower within an enlargement of the chimney or flue, or an extension thereof, it will be obvious that any variation of form or location of this may be adopted, so long as the heated products of combustion are caused to surround or pass around wholly or partly the case of the fan-blower to heat the atmospheric air as it passes through it. It will also be evident that instead of using a blowing-wheel—such as I have herein described—any other efficient blower may be substituted.

What I claim as my invention, and desire to secure by Letters Patent, is—

1. The method of impeding the escape of the products of combustion by means of the bed of gravel, or other solid equivalent thereof, substantially as herein described, in combination with a blast in a closed ash-pit, as set forth, whereby the gaseous products of combustion are maintained under pressure in the furnace, and escape therefrom by reason of the pressure in the furnace instead of exhaustion in the chimney.

2. Returning to and forcing through the fire a portion of the products of combustion, together with atmospheric air, substantially as herein described, that the inflammable or combustible matter may be the more thoroughly consumed, as herein described.

3. In combination with the supplying of the blast of mixed atmospheric air and a portion of the products of combustion, the method of impeding the escape of the products of combustion from the furnace, or the equivalent thereof, substantially as herein described.

4. Placing the fan-blower within an enlargement of the furnace, or chimney, or flue, substantially as described, that it may be surrounded or acted upon by the heated products of combustion for the purpose of heating the atmospheric air as it passes through for the blast, as described.

5. Connecting and combining the damper that governs the pipe through which the blast passes from the fan-blower to the furnace with the furnace-door in such manner as that the opening of the one shall close the other, and vice versa, for the purpose and in the manner substantially as herein described.

F. P. DIMPFEL.

Witnesses:
C. H. FISHER,
M. CAMPBELL